United States Patent
Wang et al.

(10) Patent No.: US 10,616,467 B2
(45) Date of Patent: *Apr. 7, 2020

(54) IMAGING DEVICE AND OPERATING METHOD THEREOF

(71) Applicant: PixArt Imaging Inc., Hsin-Chu County (TW)

(72) Inventors: Guo-Zhen Wang, Hsin-Chu County (TW); Ren-Hau Gu, Hsin-Chu County (TW); En-Feng Hsu, Hsin-Chu County (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,484

(22) Filed: Oct. 30, 2018

(65) Prior Publication Data

US 2019/0068872 A1    Feb. 28, 2019

Related U.S. Application Data

(63) Continuation of application No. 15/374,499, filed on Dec. 9, 2016, now Pat. No. 10,148,864, which is a (Continued)

(30) Foreign Application Priority Data

Jul. 2, 2015    (TW) .............................. 104121577 A

(51) Int. Cl.
*H04N 5/232* (2006.01)
*G06K 9/00* (2006.01)
(Continued)

(52) U.S. Cl.
CPC .......... *H04N 5/23212* (2013.01); *G02B 7/28* (2013.01); *G02B 7/365* (2013.01); *G06K 7/10722* (2013.01); *G06K 7/1417* (2013.01); *G06K 9/00255* (2013.01); *H04N 5/3696* (2013.01); *H04N 13/229* (2018.05);
(Continued)

(58) Field of Classification Search
CPC ............ H04N 5/23212; H04N 5/2258; H04N 5/23296; H04N 5/374; H04N 5/243; H04N 5/335; H04N 9/3194; G06K 9/4642; G06K 9/6218; G06K 7/10722; G06K 7/1417; G06K 9/00255; G02B 7/365; G02B 7/38
See application file for complete search history.

(56) References Cited

U.S. PATENT DOCUMENTS 10,148,864 B2 * 12/2018 Wang ................. H04N 5/23212
2006/0204121 A1 *  9/2006 Bryll .................... G06K 9/6288
                                                            382/255

(Continued)

*Primary Examiner* — Jingge Wu
(74) *Attorney, Agent, or Firm* — WPAT, PC

(57) ABSTRACT

An imaging device including a pixel matrix and a processor is provided. The pixel matrix includes a plurality of phase detection pixels and a plurality of regular pixels. The processor performs autofocusing according to pixel data of the phase detection pixels, and determines an operating resolution of the regular pixels according to autofocused pixel data of the phase detection pixels, wherein the phase detection pixels are always-on pixels and the regular pixels are selectively turned on after the autofocusing is accomplished.

20 Claims, 11 Drawing Sheets

Related U.S. Application Data continuation-in-part of application No. 15/150,584, filed on May 10, 2016, now Pat. No. 9,978,154.

(51) Int. Cl.

| | | |
|---|---|---|
| *G02B 7/36* | (2006.01) | |
| *G06K 7/14* | (2006.01) | |
| *G06K 7/10* | (2006.01) | |
| *G02B 7/28* | (2006.01) | |
| *H04N 5/369* | (2011.01) | |
| *H04N 13/232* | (2018.01) | |
| *H04N 13/229* | (2018.01) | |
| *G02B 3/00* | (2006.01) | |
| *H04N 13/00* | (2018.01) | |
| *H04N 13/257* | (2018.01) | |
| *H04N 13/218* | (2018.01) | |

(52) U.S. Cl.
CPC ......... *H04N 13/232* (2018.05); *G02B 3/0006* (2013.01); *H04N 13/218* (2018.05); *H04N 13/257* (2018.05); *H04N 2013/0081* (2013.01)

(56) References Cited

U.S. PATENT DOCUMENTS

| | | | |
|---|---|---|---|
| 2008/0218612 A1* | 9/2008 | Border | G01S 19/45 348/262 |
| 2008/0218613 A1* | 9/2008 | Janson | G03B 15/00 348/262 |
| 2009/0295964 A1 | 12/2009 | Utagawa et al. | |
| 2009/0322918 A1 | 12/2009 | Shintani | |
| 2010/0053354 A1 | 3/2010 | Hayasaka et al. | |
| 2012/0044406 A1* | 2/2012 | Shimoda | G02B 7/365 348/345 |
| 2013/0120609 A1* | 5/2013 | Okazawa | H04N 5/23212 348/223.1 |
| 2013/0126729 A1* | 5/2013 | Own | C12Q 1/6869 250/307 |
| 2013/0136363 A1* | 5/2013 | Na | G06K 9/00456 382/190 |
| 2013/0222546 A1* | 8/2013 | Takahashi | H01L 27/14623 348/46 |
| 2014/0145068 A1* | 5/2014 | Meynants | H01L 27/14605 250/208.1 |
| 2014/0253787 A1* | 9/2014 | Shu | H04N 5/23212 348/353 |
| 2015/0365584 A1* | 12/2015 | Samurov | G03B 13/36 348/349 |
| 2016/0064430 A1* | 3/2016 | Lee | H01L 27/1463 348/302 |
| 2016/0239974 A1* | 8/2016 | Wang | G01C 3/32 |
| 2016/0241772 A1* | 8/2016 | Johnson | H04N 5/3696 |
| 2016/0344961 A1* | 11/2016 | Li | H04N 5/3696 |
| 2016/0353006 A1* | 12/2016 | Andersen | H04N 17/002 |
| 2016/0360093 A1* | 12/2016 | Ikeda | H04N 5/3696 |
| 2016/0365373 A1* | 12/2016 | Keelan | H01L 27/14605 |
| 2017/0148832 A1* | 5/2017 | Yamashita | H01L 27/14607 |
| 2017/0261318 A1 | 9/2017 | Takagi et al. | |

* cited by examiner

IMAGING DEVICE AND OPERATING METHOD THEREOF

CROSS REFERENCE TO RELATED APPLICATION

The present application is a continuation application of U.S. patent application Ser. No. 15/374,499 filed on, Dec. 9, 2016, which is a continuation-in-part application of U.S. patent application Ser. No. 15/150,584 filed on, May 10, 2016, and claims priority to Taiwanese Application Number 104121577, filed on Jul. 2, 2015, the disclosures of which are hereby incorporated by reference herein in their entirety.

BACKGROUND

1. Field of the Disclosure

This disclosure generally relates to an optical sensing element, more particularly, to an imaging device having always-on phase detection pixels that selects to perform the image decoding or the image recognition according to image data of the phase detection pixels.

2. Description of the Related Art

In general, a distance measurement system employs a light source and calculates an object distance according to energy of light beam of the light source reflected back by the object. Traditionally, it is able to calculate the distance using the triangulation method or time-of-flight (TOF) technique. However, the above methods require a higher cost and larger system size.

In addition, the development of gesture recognition generally removes the background image at first by using a 3D image in order to separate the foreground image. In this technique, two image sensors are used such that the size and cost of a gesture recognition module cannot be effectively reduced.

As mentioned above, the present disclosure obtains a 3D image by using the phase detection, and an additional illumination light (as used in the TOF technique mentioned above) is not required. Meanwhile, in the proposed technique of the present disclosure, the distance measurement and the gesture recognition are implemented by only employing a single image sensor.

SUMMARY

Accordingly, the present disclosure provides an imaging device having always-on phase detection pixels that determines the turned-on resolution of regular pixels according to the image feature of pixel data of the phase detection pixels to perform different image post-processing.

The present disclosure provides an imaging device including a condensing lens, an image sensor and a processor. The image sensor is configured to detect light passing through the condensing lens and including a pixel matrix. The pixel matrix includes a plurality of phase detection pixel pairs and a plurality of regular pixels. The processor is configured to turn on the phase detection pixel pairs configured for autofocusing and output autofocused pixel data after the autofocusing is accomplished, divide the autofocused pixel data into a first subframe and a second subframe, calculate image features of at least one of the first subframe and the second subframe, and determine an operating resolution of the regular pixels according to the calculated image features. The phase detection pixel pairs are always on when the imaging device is powered on, and pixel data of the regular pixels is not used in the autofocusing.

The present disclosure further provides an imaging device including a condensing lens, an image sensor and a processor. The image sensor is configured to detect light passing through the condensing lens and including a pixel matrix. The pixel matrix includes a plurality of phase detection pixel pairs and a plurality of regular pixels. The processor is configured to turn on the phase detection pixel pairs configured for autofocusing and output autofocused pixel data after the autofocusing is accomplished, divide the autofocused pixel data into a first subframe and a second subframe, calculate image features of at least one of the first subframe and the second subframe, and select an image decoding or an image recognition using pixel data of the regular pixels according to the calculated image features of the autofocused pixel data of the phase detection pixel pairs. The phase detection pixel pairs are always on when the imaging device is powered on, and the regular pixels are selectively activated for the image decoding or the image recognition.

The present disclosure further provides an operating method of an imaging device. The imaging device includes a plurality of phase detection pixel pairs and a plurality of regular pixels. The operating method includes the steps of: turning on the phase detection pixel pairs for autofocusing and outputting autofocused image frame after the autofocusing is accomplished; dividing the autofocused image frame, acquired by the phase detection pixel pairs, into a first subframe and a second subframe; calculating image features of at least one of the first subframe and the second subframe; and selectively activating at least a part of the regular pixels according to the calculated image features of the autofocused image frame. The phase detection pixel pairs are continuously turned on when the at least a part of the regular pixels are activated, and the regular pixels are not activated in the autofocusing.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
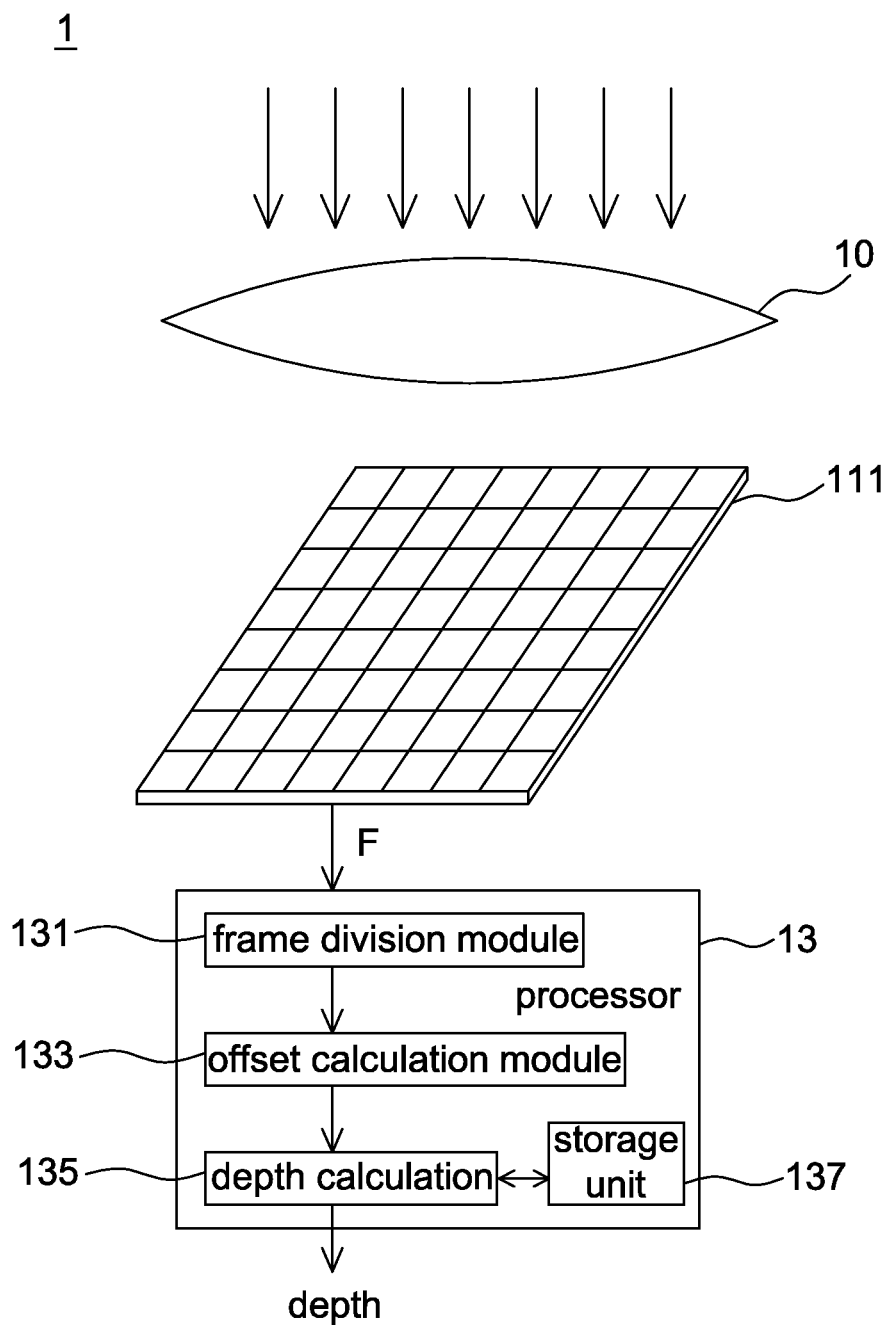
FIG. 1 is a schematic block diagram of a distance measurement device according to one embodiment of the present disclosure.
Figure 2A:
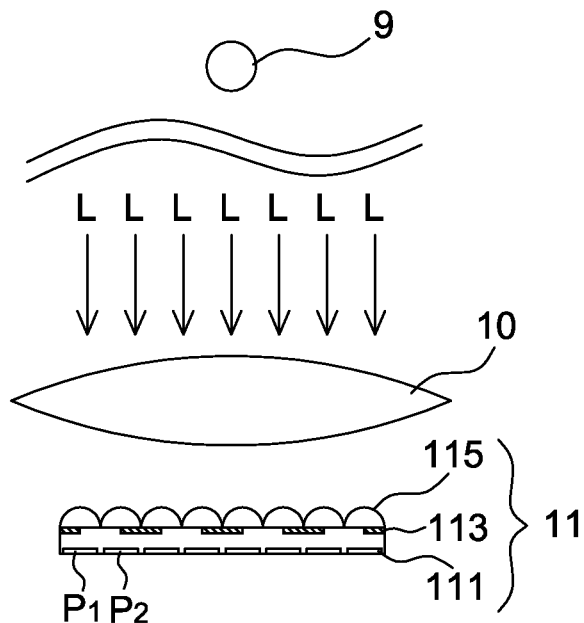
FIGS. 2A-2B are cross sectional views of an image sensor and a condensing lens of a distance measurement device according to some embodiments of the present disclosure.
Figure 2B:
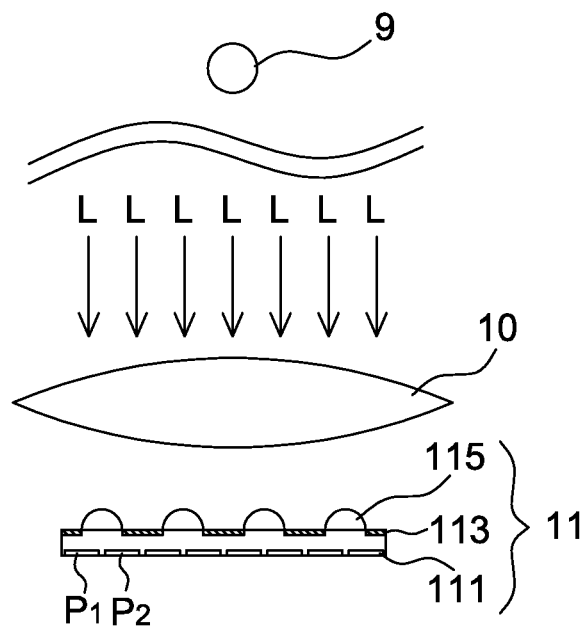

Referring to FIGS. 1 and 2A-2B, FIG. 1 is a schematic block diagram of a distance measurement device 1 according to one embodiment of the present disclosure; and FIGS. 2A-2B are cross sectional views of an image sensor and a condensing lens of a distance measurement device according to some embodiments of the present disclosure. The distance measurement device 1 includes a condensing lens 10, an image sensor 11 and a processor 13. In some embodiments, the processor 13 is, for example, disposed in a chip together with the image sensor 11. In some embodiments, the processor 13 is an external processing unit of the image sensor 11, and configured to receive and process an image frame F captured by the image sensor 11 for calculating a depth of at least one image region or constructing a depth map of the image frame F, i.e., a depth map of a plurality of image regions. For example, the processor 13 is a microprocessor (MCU), a central processing unit (CPU), a digital signal processor (DSP) or the like for processing the image frame F outputted by the image sensor 11.

The condensing lens 10 is arranged, for example, inside a lens of an image capturing device (e.g., a camera). The condensing lens 10 is a single lens or a lens set arranged along an optical axis without particular limitations. For simplification purposes, a single lens is shown herein. The condensing lens 10 is used as a lens window configured to collect light L from an object 9 and guide the light L to the image sensor 11. A distance between the condensing lens 10 and the image sensor 11 is preferably equal to a first focal length of the condensing lens 10 (e.g., the focal length at a side of the image sensor 11).

The image sensor 11 detects light passing through the condensing lens 10 based on a predetermined focal length and outputs an image frame F. The image sensor 11 includes a pixel matrix 111 (e.g., an 8×8 pixel matrix is shown herein for illustration purposes), a cover layer 113 and a plurality of microlenses 115, wherein the cover layer 113 is patterned to cover upon at least a part of a plurality of pixels included in the pixel matrix 111 such that uncovered regions of the pixels receive incident light of different phases through different parts of the microlenses 115. The predetermined focal length herein is referred to a focal length formed by both the condensing lens 10 and the microlenses 115, and at a light incident side of the condensing lens 10. The predetermined focal length is sometimes referred to a predetermined focal length of the condensing lens 10 or of the image sensor 11 for abbreviation.

The inventor noticed that when an object 9 reflects the light L at a second focal length of the condensing lens 10 (e.g., a focal length at the other side of the image sensor 11, i.e. the predetermined focal length) to the distance measurement device 1, an object image in the image frame F outputted from the image sensor 11 does not have a position shift; whereas, when the object 9 is not at the second focal length of the condensing lens 10, the object image in the image frame F outputted by the image sensor 11 has a position shift toward different directions in subframes corresponding to pixels of different cover patterns, illustrated hereinafter with an example. Accordingly, a depth difference of the object 9 deviated from the predetermined focal length is identifiable according to the position shift so as to obtain a distance (i.e. a depth) from the image sensor 11 (or the condensing lens 10) to implement a distance measurement device 1 of the present disclosure.

Figure 3:
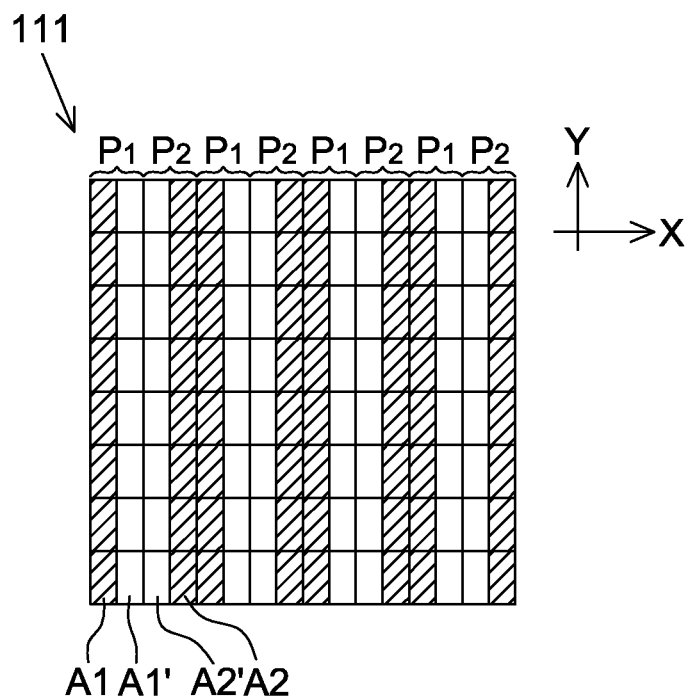
FIG. 3 is a schematic diagram of a pixel matrix and a cover layer of a distance measurement device according to one embodiment of the present disclosure.

Referring to FIG. 3, it is a schematic diagram of a pixel matrix and a cover layer of a distance measurement device according to one embodiment of the present disclosure. In one embodiment, the pixel matrix 111 includes a first pixel group $P_1$ and a second pixel group $P_2$ arranged in a first direction (e.g., X direction) and a second direction (e.g., Y direction). It should be mentioned that in the present disclosure, the first pixel group $P_1$ and the second pixel group $P_2$ have different covered regions. For example, in a monochromatic image sensor, pixel structures of the first pixel group $P_1$ and the second pixel group $P_2$ are identical, whereas the cover patterns thereupon are different. For example, in a color image sensor, both the first pixel group $P_1$ and the second pixel group $P_2$ include, for example, red pixels (e.g., forming a red filter on a pixel), green pixels (e.g., forming a green filter on a pixel), blue pixels (e.g., forming a blue filter on a pixel) or pixels of other colors, but the cover patterns upon the first pixel group $P_1$ and the second pixel group $P_2$ are different.

The cover layer 113 is formed, for example, by the metal layer which is used as electrical paths (e.g., at least one layer of M1 to M10 of the CMOS manufacturing process), an opaque layer different from the metal layer or a combination thereof without particular limitations. In this embodiment, the cover layer 113 covers upon a first region A1 of a plurality of first pixels of the first pixel group $P_1$ and upon a second region A2 of a plurality of second pixels of the second pixel group $P_2$. In FIG. 3, the second region A2 is at a side along the first direction (e.g., X direction) and the first region A1 is at a side of an inverse direction of the first direction such that the first region A1 of the first pixel group $P_1$ and the second region A2 of the second pixel group $P_2$ form rectangles of mirror symmetry along the first direction. In addition, the first pixel group $P_1$ has an uncovered region A1' outside the first region A1, and the second pixel group $P_2$ has an uncovered region A2' outside the second region A2, wherein the uncovered regions A1' and A2' receive incident light of different phases respectively through different parts of the microlenses 115.

For example in FIG. 3, the first region A1 is shown at a left side of the first pixels and the second region A2 is shown at a right side of the second pixels. It should be mentioned that although FIG. 3 shows that the first region A1 and the second region A2 are 50% of an area of a single pixel, it is only intended to illustrate but not to limit the present disclosure. In other embodiments, the first region A1 and the second region A2 are 5% to 95% of an area of a single pixel without particular limitations.

The microlenses 115 are aligned with at least one of one of the first pixels and one of the second pixels. In some embodiments, the microlenses 115 are respectively aligned with each of the first pixels and each of the second pixels, as shown in FIG. 2A. In another embodiment, each of the microlenses 115 is aligned with the uncovered region A1' outside the first region A1 of the first pixels and the uncovered region A2' outside the second region A2 of the second pixels at the same time, as shown in FIG. 2B. Accordingly, the first pixel group $P_1$ and the second pixel group $P_2$ receive incident light of different phases respectively through a first part of the microlenses 115 (e.g., the right part of the microlenses 115) and a second part of the microlenses 115 (e.g., the left part of the microlenses 115). It should be mentioned that although FIGS. 2A and 2B show that the uncovered regions (e.g., A1' and A2') of the first pixel group $P_1$ and the second pixel group $P_2$ are substantially a half of the microlenses 115, they are only intended to illustrate but not to limit the present disclosure. It is appreciated that the part of light capable of penetrating the microlenses 115 to reach the uncovered regions is determined according to the first region A1 and the second region A2 of the cover layer 113. In the present disclosure, the first part and the second part of the microlenses 115 are selected to be 5% to 95% of the microlenses 115.

The processor 13 is used to calculate a depth of at least one image region in an image frame F, e.g., dividing the image frame F into a first subframe and a second subframe, calculating an offset corresponding to the image region according to the first subframe and the second subframe, and calculating the depth according to the offset, wherein the first subframe is associated with the first pixel group $P_1$ and the second subframe is associated with the second pixel group $P_2$. More specifically, the first subframe is formed by gray level data outputted by the first pixel group $P_1$ and second subframe is formed by gray level data outputted by the second pixel group $P_2$.

Referring to FIGS. 1 to 4, FIG. 4 is an operational schematic diagram of a distance measurement method according to one embodiment of the present disclosure. In one embodiment, the processor 13 includes a frame division module 131, an offset calculation module 133, a depth calculation module 135 and a storage unit 137, wherein the frame division module 131, the offset calculation module 133 and the depth calculation module 135 are implemented by software and/or hardware without particular limitations. For illustration purposes, the frame division module 131, the offset calculation module 133 and the depth calculation module 135 are shown to be separated from each other, but operations thereof are considered to be accomplished by the processor 13. The storage unit 137 previously stores a relationship, e.g., formed as a lookup table, of a plurality of offsets with respect to a plurality of depth differences distanced from the predetermined focal length for the depth calculation module 135 to calculate the depth of at least one image region according to the calculated offset.

More specifically, the predetermined focal length is already known. When an offset corresponding to an image region is obtained, a depth difference of the image region from the predetermined focal length is obtainable according to the lookup table, and the depth of the at least one image region is obtainable by adding the depth difference to or subtracting the depth difference from the predetermined focal length.

Figure 4:
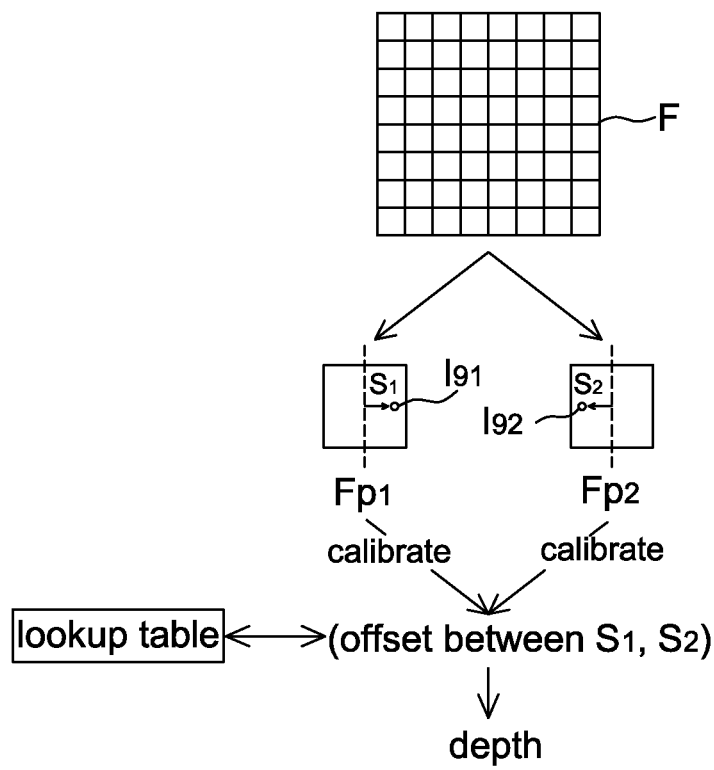
FIG. 4 is an operational schematic diagram of a distance measurement method according to one embodiment of the present disclosure.

In FIG. 4, a dot object 9 located at a light incident side of the condensing lens 10 is taken as an example for illustration. The image sensor 11 captures, based on a predetermined focal length, and outputs an image frame F to the processor 13. The frame division module 131 divides the image frame F into a first subframe $F_{P1}$ and a second subframe $F_{P2}$, wherein the first subframe $F_{P1}$ is associated with the first pixel group $P_1$ and the second subframe $F_{P2}$ is associated with the second pixel group $P_2$. When the object 9 is located at the second focal length (i.e. the predetermined focal length) of the condensing lens 10, image regions associated with the object 9 in the first subframe $F_{P1}$ and the second subframe $F_{P2}$ are substantially at corresponding positions with no offset. When the object 9 is not located at the second focal length of the condensing lens 10, the image regions associated with the object 9 in the first subframe $F_{P1}$ and the second subframe $F_{P2}$ have an offset therebetween and are not at corresponding positions. For example, FIG. 4 shows that a first image region $I_{91}$ in the first subframe $F_{P1}$ shifts rightward from a center line (e.g., the dashed line) by $S_1$, and a second image region $I_{92}$ in the second subframe $F_{P2}$ shifts leftward from a center line (e.g., dashed line) by $S_2$. The offset calculation module 133 calculates an offset between $S_1$ and $S_2$, e.g., $(S_1-S_2)$. It is appreciated that the offset is not limited to be calculated based on the center line, and the center line used herein is only taken as an example. It is also possible to calculate the offset by using the block matching or motion detection without particular limitations as long as the offset between corresponded image regions (e.g., $I_{91}$ and $I_{92}$) in the first subframe $F_{P1}$ and the second subframe $F_{P2}$ are obtainable.

It should be mentioned that although FIG. 4 shows that the first image region $I_{91}$ shifts rightward by $S_1$ and the second image region $I_{92}$ shifts leftward by $S_2$, it is only intended to illustrate but not to limit the present disclosure. The shift direction of the image region corresponding to the object 9 is determined according to whether the object 9 is close to or away from the condensing lens 10 from the second focal length as well as the covered regions (e.g., A1 and A2) of the first pixel group $P_1$ and the second pixel group $P_2$. For example, FIG. 4 shows a condition under the arrangement of FIG. 2A when the object 9 is far from the condensing lens 11 from the second focal length thereof.

The depth calculation module 135 calculates a depth of the image region according to the offset between $S_1$ and $S_2$ in conjunction with a relationship of a plurality of offsets with respect to a plurality depth differences deviated from the predetermined focal length previously stored in the storage unit 137. For example, when $S_1$ and $S_2$ are substantially identical to zero, it is able to identify that a depth of the image region is substantially equal to the second focal length, which is known previously. In one embodiment, said relationship is a relation of offsets between $S_1$ and $S_2$ with respect to depth differences from the predetermined focal length. Meanwhile, under the arrangement of FIG. 2A and assuming that a right side of a center line in FIG. 4. is positive and a left side of the center line in FIG. 4 is negative, when $(S_1-S_2)$ is a negative value, it means that the depth is smaller than the second focal length; whereas, when $(S_1-S_2)$ is a positive value, it means that the depth is larger than the second focal length. If the offset is not calculated by subtraction, a direction of the depth difference is determined according to a direction of shift.

It should be mentioned that in this embodiment the image region is shown as a circle (corresponding to the dot object 9) for illustration purposes, but the present disclosure is not limited thereto. The image region is any feature (e.g., edges) in the image frame F capable of showing an offset without particular limitations.

In addition, to increase the identification accuracy, the processor 13 further calibrates brightness of the first subframe $F_{P1}$ and the second subframe $P_{P2}$ to be substantially identical by a shading algorithm. Accordingly, it is able to correctly identify corresponded image regions (e.g., image regions having identical brightness) in the first subframe $F_{P1}$ and the second subframe $F_{P2}$, e.g., $I_{91}$ and $I_{92}$. For example, when the image frame F contains a plurality of pixel regions, depths of the plurality of pixel regions are calculated respectively by using the same method mentioned above so as to construct a depth map.

In addition, FIG. 3 shows that the first pixel group $P_1$ and the second pixel group $P_2$ are arranged alternatively along the X direction. In other embodiments, it is possible that the first pixel group $P_1$ and the second pixel group $P_2$ are arranged alternatively along the Y direction; in this case, the dashed lines in FIG. 4 are changed to horizontal lines and the image regions are shifted upward and downward from the center line. Since only the shift direction is different but the calculation itself is not changed, details thereof are not repeated herein.

Figure 5A:
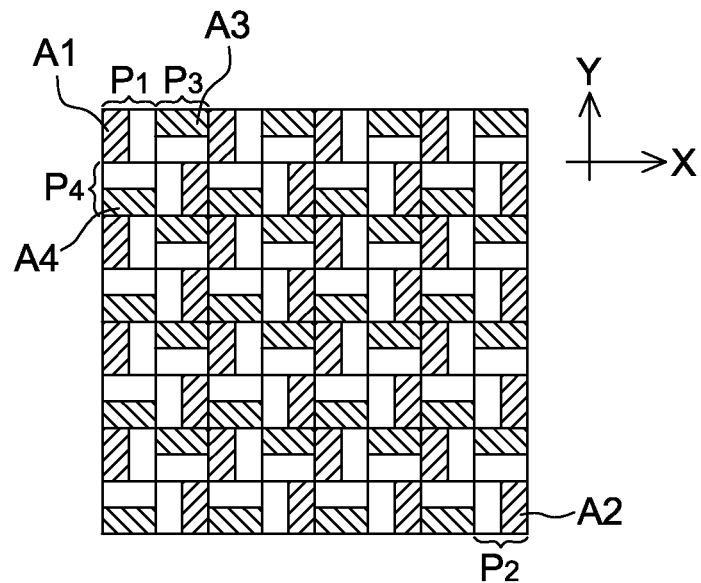
FIGS. 5A-5D are schematic diagrams of a pixel matrix and a cover layer of a distance measurement device according to some embodiments of the present disclosure.
Figure 5B:
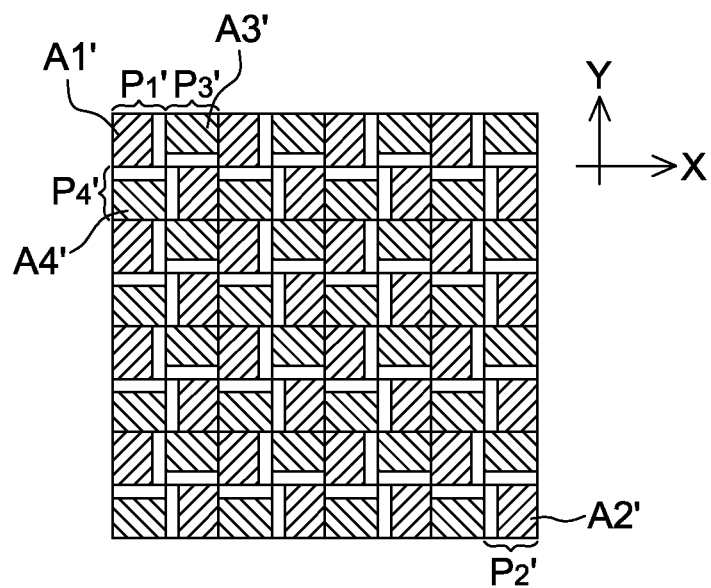

Referring to FIGS. 5A and 5B, they are schematic diagrams of a pixel matrix and a cover layer of a distance measurement device according to some embodiments of the present disclosure. In this embodiment, the pixel matrix 111 further includes a third pixel group $P_3$ and a fourth pixel group $P_4$ arranged in the first direction (e.g., X direction) and the second direction (e.g., Y direction). The cover layer 113 further covers upon a third region A3 of a plurality of third pixels of the third pixel group $P_3$ and upon a fourth region A4 of a plurality of fourth pixels of the fourth pixel group $P_4$, wherein the third region A3 is at a side along the second direction (e.g., Y direction) and the fourth region A4 is at a side along an inverse direction of the second direction. For example in FIGS. 5A to 5B, the third region A3 is at an upper side of the third pixels and the fourth region A4 is at a lower side of the fourth pixels such that the third region A3 and the fourth region A4 form rectangles of mirror symmetry along the second direction.

More specifically, in the embodiments of FIGS. 5A to 5B, the cover layer 113 covers upon the pixel matrix 111 and includes a first cover pattern covering upon a first region A1 of a plurality of first pixels of the first pixel group $P_1$, a second cover pattern covering upon a second region A2 of a plurality of second pixels of the second pixel group $P_2$, a third cover pattern covering upon a third region A3 of a plurality of third pixels of the third pixel group $P_3$, and a fourth cover pattern covering upon a fourth region A4 of a plurality of fourth pixels of the fourth pixel group $P_4$, wherein the first region A1 and the second region A2 form rectangles of mirror symmetry along a first direction and adjacent to each other along a diagonal direction of the pixel matrix, and the third region A3 and the fourth region A4 form rectangles of mirror symmetry along a second direction and adjacent to each other along another diagonal direction of the pixel matrix. In one embodiment, the first direction is perpendicular to the second direction.

In this embodiment, one first pixel $P_1$ ($P_1'$), one second pixel $P_2$ ($P_2'$), one third pixel $P_3$ ($P_3'$) and one fourth pixel $P_4$ ($P_4'$) adjacent to each other form a sub pixel group, and the first region A1 (A1'), the second region A2 (A2'), the third region A3 (A3') and the fourth region A4 (A4') in the sub pixel group have substantially identical areas, wherein the first pixels (i.e. the first cover pattern) are adjacent to the second pixels (i.e. the second cover pattern) along a diagonal direction, and the third pixels (i.e. the third cover pattern) are adjacent to the fourth pixels (i.e. the fourth cover pattern) along another diagonal direction.

In one embodiment, all the first region A1, the second region A2, the third region A3 and the fourth region A4 of the pixel matrix 111 have substantially identical areas (as shown in FIGS. 5A to 5B), e.g., 5% to 95% of an area of a single pixel.

Figure 5C:
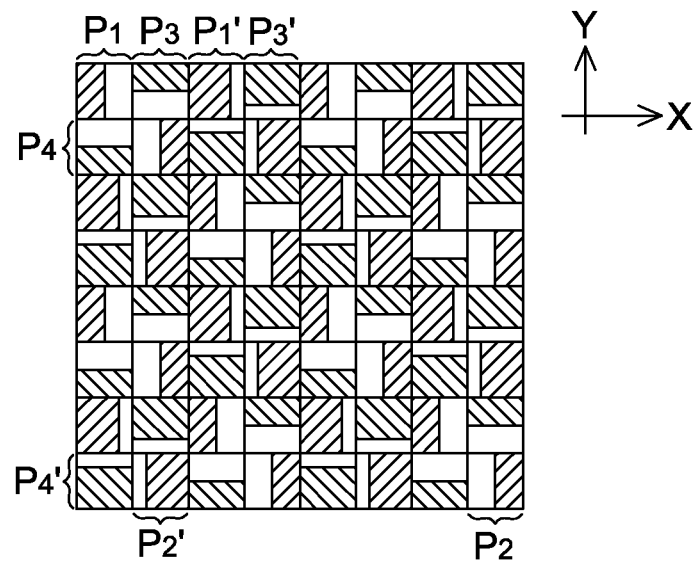
Figure 5D:
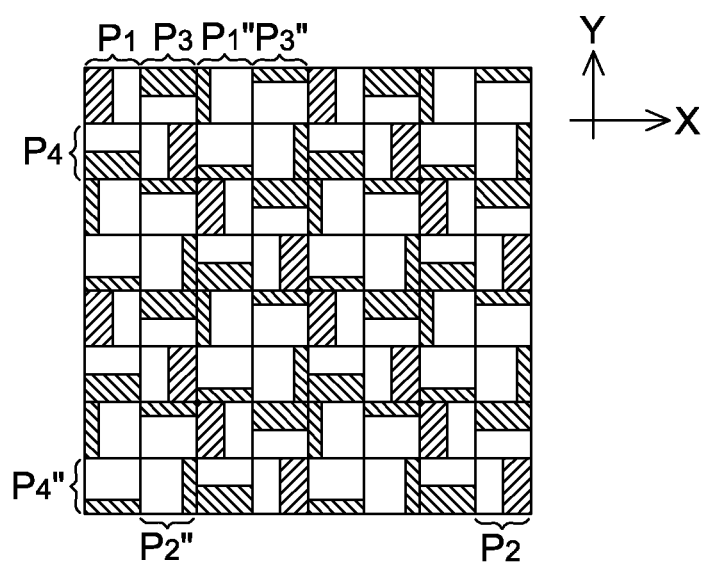

Referring to FIGS. 5C to 5D, they are schematic diagrams of a pixel matrix and a cover layer of a distance measurement device according to some embodiments of the present disclosure. In other embodiments, the covered areas in two sub pixel groups adjacent along the first direction (e.g., X direction) and the second direction (e.g., Y direction) are different. In some embodiments, the first region to the fourth region of a first sub pixel group (e.g., formed by pixels $P_1$ to $P_4$) are 50% of an area of a single pixel, and the first region to the fourth region of a second sub pixel group (e.g., formed by pixels $P_1''$ to $P_4''$) are 5% to 45% of an area of a single pixel (as shown in FIG. 5D). In some embodiments, the first region to the fourth region of a first sub pixel group (e.g., formed by pixels $P_1$ to $P_4$) are 50% of an area of a single pixel, and the first region to the fourth region of a second sub pixel group (e.g., formed by pixels $P_1'$ to $P_4'$) are 55% to 95% of an area of a single pixel (as shown in FIG. 5C).

According to the embodiments of FIGS. 5A to 5D, in addition to the offsets in two directions are obtainable according to the pixels arranged along the X direction (e.g., first pixels $P_1$, $P_1'$ and $P_1''$ and second pixels $P_2$, $P_2'$ and $P_2''$) and pixels arranged along the Y direction (e.g., third pixels $P_3$, $P_3'$ and $P_3''$ and fourth pixels $P_4$, $P_4'$ and $P_4''$), the objects of confirming depths and having different depth resolutions are implemented (described hereinafter with an example).

Figure 6:
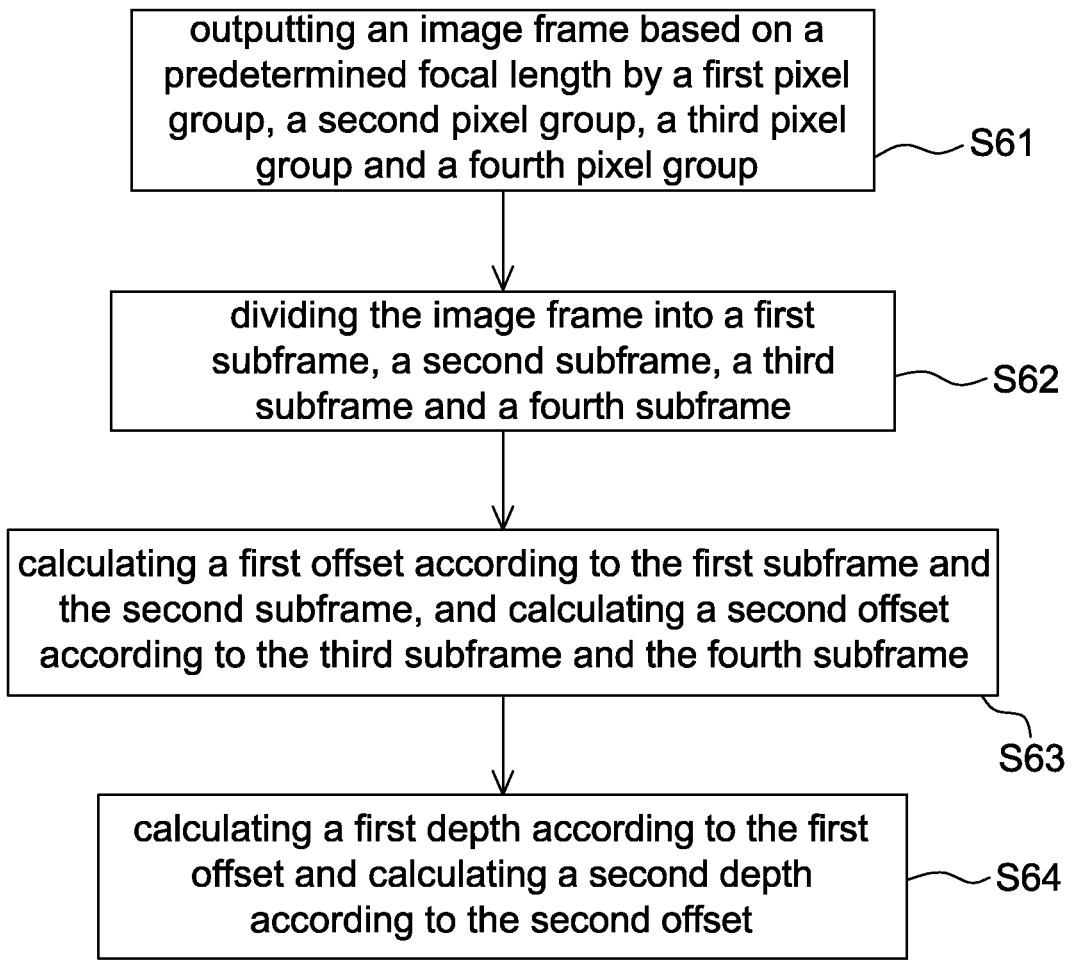
FIG. 6 is a flow chart of a distance measurement method according to an embodiment of the present disclosure.
Figure 8:
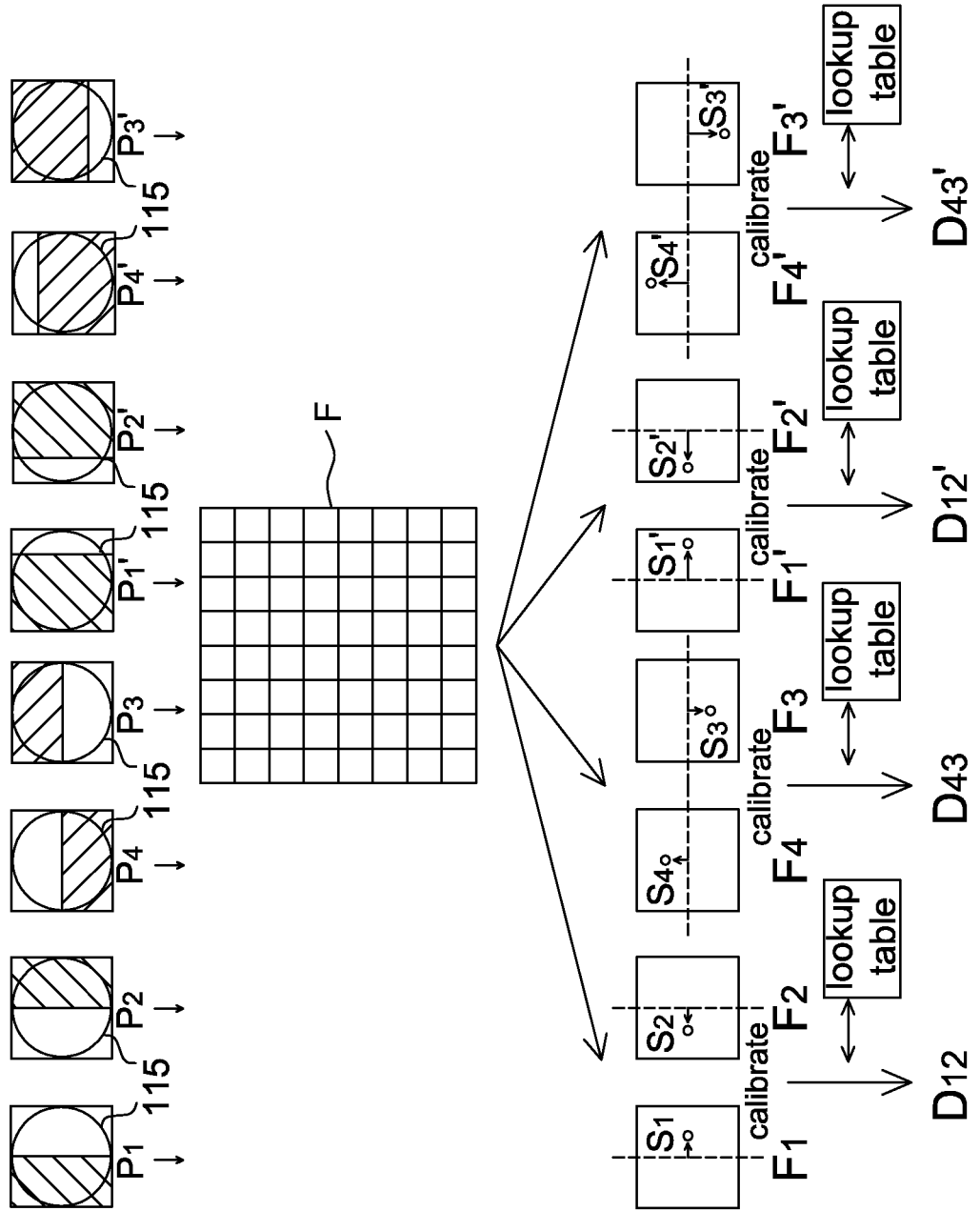
FIG. 8 is an operational schematic diagram of a distance measurement method according to an alternative embodiment of the present disclosure.

Referring to FIG. 6, it is a flow chart of a distance measurement method of a distance measurement device according to one embodiment of the present disclosure. The distance measurement device of this embodiment includes a first pixel group $P_1$, a second pixel group $P_2$, a third pixel group $P_3$, a fourth pixel group $P_4$ (as shown in FIGS. 5A to 5D) and a plurality of microlenses 115 (as shown in FIGS. 2A to 2B). The first pixel group $P_1$ and the second pixel group $P_2$ receive incident light of different phases respectively through a first part and a second part of the microlenses 115, and the third pixel group $P_3$ and the fourth pixel group $P_4$ receive incident light of different phases respectively through a third part and a fourth part of the microlenses 115, wherein the first part and the second part are two opposite sides of the microlenses 115 along a first axis (e.g., X direction), and the third part and the fourth part are two opposite sides of the microlenses 115 along a second axis (e.g., Y direction) as shown in FIG. 8.

The distance measurement method of this embodiment includes the steps of: outputting an image frame based on a predetermined focal length by a first pixel group, a second pixel group, a third pixel group and a fourth pixel group (Step S61); dividing the image frame into a first subframe, a second subframe, a third subframe and a fourth subframe (Step S62); calculating a first offset according to the first subframe and the second subframe, and calculating a second offset according to the third subframe and the fourth subframe (Step S63); and calculating a first depth according to the first offset and calculating a second depth according to the second offset (Step S64).

Referring to FIGS. 1, 5A to 5D, 6 and 8, the implementation of this embodiment is illustrated hereinafter.

Step S61: All pixels of the pixel matrix 111 detect light L passing through the condensing lens 10 with a predetermined focal length such that the first pixel group $P_1$, the second pixel group $P_2$, the third pixel group $P_3$ and the fourth pixel group $P_4$ output an image frame F. That is, the image frame F is formed by image data (e.g., gray values) outputted by the first pixel group $P_1$, the second pixel group $P_2$, the third pixel group $P_3$ and the fourth pixel group $P_4$.

Step S62: The frame division module 131 of the processor 13 then divides the image frame F into a first subframe $F_1$, a second subframe $F_2$, a third subframe $F_3$ and a fourth subframe $F_4$, wherein the first subframe $F_1$ is associated with the first pixel group $P_1$ (i.e. formed by gray level data outputted by the first pixel group $P_1$), the second subframe $F_2$ is associated with the second pixel group $P_2$ (i.e. formed by gray level data outputted by the second pixel group $P_2$), the third subframe $F_3$ is associated with the third pixel group $P_3$ (i.e. formed by gray level data outputted by the third pixel group $P_3$), and the fourth subframe $F_4$ is associated with the fourth pixel group $P_4$ (i.e. formed by gray level data outputted by the fourth pixel group $P_4$).

Step S63: The offset calculation module 133 of the processor 13 then calculates a first offset of corresponded image regions in the first subframe $F_1$ and the second subframe $F_2$ (e.g., an offset between $S_1$ and $S_2$) and a second offset of corresponded image regions in the third subframe $F_3$ and the fourth subframe $F_4$ (e.g., an offset between $S_3$ and $S_4$). As mentioned above, the calculation of the first offset and the second offset is calculated using the subtraction, block matching, motion detection or the like.

Step S64: The depth calculation module 135 of the processor 13 calculates a first depth $D_{12}$ according to the first offset and calculates a second depth $D_{43}$ according to the second offset. In this embodiment, the first depth $D_{12}$ is obtained, for example, according to the offset in a first direction referring to a lookup table, and the second depth $D_{43}$ is obtained, for example, according to the offset in a second direction referring to the lookup table, wherein the first direction is perpendicular to the second direction. As mentioned above, a lookup table previously stores a relationship of a plurality of offsets with respect to a plurality of depth differences distanced from the predetermined focal length.

Similarly, before calculating the first offset and the second offset, the processor 13 further calibrates brightness of the first subframe $F_1$ and the second subframe $F_2$ to be substantially identical and calibrates brightness of the third subframe $F_3$ and the fourth subframe $F_4$ to be substantially identical using a shading algorithm to correctly identify the corresponded object regions.

The above embodiment of FIG. 6 operates according to the arrangement of FIGS. 5A and 5B, and thus only the left part of FIG. 8 is considered. The embodiment blow of FIG. 7 operates according to the arrangement of FIG. 5C and thus the whole of FIG. 8 is considered. The operation according to the arrangement of FIG. 5D is similar to that according to the arrangement of FIG. 5C and thus details thereof are not repeated herein.

Figure 7:
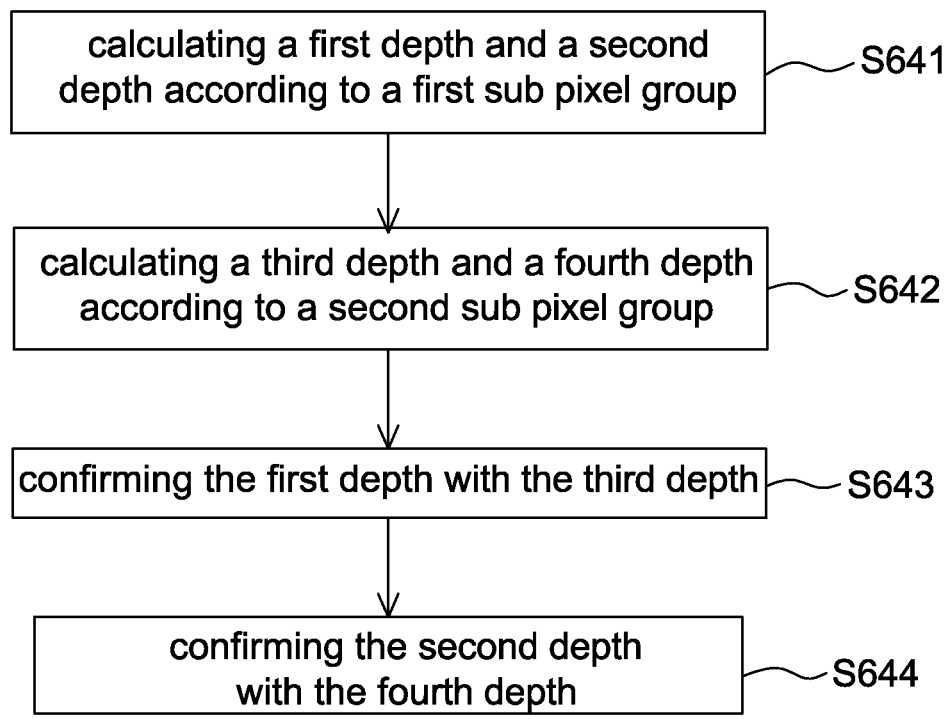
FIG. 7 is a flow chart of a distance measurement method according to another embodiment of the present disclosure.

Referring to FIG. 7, it is a flow chart of a distance measurement method of a distance measurement device according to another embodiment of the present disclosure. In this embodiment, one first pixel $P_1$ (PC), one second pixel $P_2$ (P2'), one third pixel $P_3$ ($P_3$') and one fourth pixel $P_4$ ($P_4$') adjacent to each other form a sub pixel group. In two sub pixel groups adjacent along the first axis (e.g., X direction) and the second axis (e.g., Y direction), when the first region to the fourth region in a first sub pixel group (e.g., $P_1$ to $P_4$) are smaller than the first region to the fourth region in a second sub pixel group (e.g., $P_1$' to $P_4$'), and when the first depth $D_{12}$ and the second depth $D_{43}$ are obtained according to the first sub pixel group (e.g., $P_1$ to $P_4$), the distance measurement method of this embodiment includes the steps of: calculating a first depth and a second depth according to the first sub pixel group (Step S641); calculating a third depth and a fourth depth according to the second sub pixel group (Step S642); confirming the first depth with the third depth (Step S643); and confirming the second depth with the fourth depth (Step S644), wherein the Step S641 is to perform the steps of FIG. 6, and the Step S642 is similar to FIG. 6 only the calculated sub pixel group is different. In addition, the Steps S641 and S642 are possible to operate simultaneously as shown in FIG. 8. The Step S642 is further illustrated below, whereas the Step S641 is not repeated herein.

All pixels of the pixel matrix 111 detect light penetrating the condensing lens 10 with a predetermined focal length, and the first pixel group PC, the second pixel group $P_2$', the third pixel group $P_3$' and the fourth pixel group $P_4$' output a part of an image frame F. The other part of the image frame F is outputted by the first pixel group $P_1$, the second pixel group $P_2$, the third pixel group $P_3$ and the fourth pixel group $P_4$. That is, The image frame F is formed together by image data (e.g., gray values) outputted by the first pixel group $P_1$, the second pixel group $P_2$, the third pixel group $P_3$ and the fourth pixel group $P_4$ as well as the first pixel group PC, the second pixel group $P_2$', the third pixel group $P_3$' and the fourth pixel group $P_4$'.

The frame division module 131 of the processor 13 further divides the image frame F into a first subframe $F_1$', a second subframe $F_2$', a third subframe $F_3$' and a fourth subframe $F_4$', wherein the first subframe $F_1$' is associated with the first pixel group $P_1$' (i.e. formed by gray level data outputted by the first pixel group PC), the second subframe $F_2$' is associated with the second pixel group $P_2$' (i.e. formed by gray level data outputted by the second pixel group $P_2$'), the third subframe $F_3$' is associated with the third pixel group $P_3$' (i.e. formed by gray level data outputted by the third pixel group $P_3$'), and the fourth subframe $F_4$' is associated with the fourth pixel group $P_4$' (i.e. formed by gray level data outputted by the fourth pixel group $P_4$').

The offset calculation module 133 of the processor 13 then calculates a first offset between corresponded image regions in the first subframe $F_1$' and the second subframe $F_2$' (e.g., an offset between $S_1$' and $S_2$'), and calculates a second offset between corresponded image regions in the third subframe $F_3$' and the fourth subframe $F_4$' (e.g., an offset between $S_3$' and $S_4$'). The calculation has been illustrated above, and thus details thereof are not repeated herein.

The depth calculation module 135 of the processor 13 calculates a third depth $D_{12}$' according to the first offset and calculates a fourth depth $D_{43}$' according to the second offset as shown in FIG. 8. Similarly, the third depth $D_{12}$' is obtained according to the offset along a first direction by checking a lookup table and the fourth depth $D_{43}$' is obtained according to the offset along a second direction by checking the lookup table.

In some cases, it is possible that one offset (e.g., the offset between $S_1$ and $S_2$ or between $S_1$' and $S_2$') corresponds to two depths, and thus in this embodiment two sets of different sub pixel groups are used to confirm one correct depth so as to improve the identification accuracy. For example in the Step S643, the third depth $D_{12}$' is used to confirm the first depth $D_{12}$, and in the Step S644, the fourth depth $D_{43}$' is used to confirm the second depth $D_{43}$, or vice versa.

In this embodiment, as the first sub pixel group and the second sub pixel group have different covered areas, the first depth $D_{12}$ and the second depth $D_{43}$ have a first resolution, and the third depth $D_{12}$' and the fourth depth $D_{43}$' have a second resolution different from the first resolution so as to improve the applicable range.

It should be mentioned that although the distance measurement method of FIG. 6 is illustrated by using the schematic diagram of FIG. 8, the present disclosure is not limited thereto. When the cover pattern of the cover layer 113 is like FIG. 3, the Steps S61 to S64 do not include the third and fourth pixel groups or do not include the first and second pixel groups, and operate only according to FIG. 4. Accordingly, the operating method includes the steps of: outputting an image frame by a first pixel group and a second pixel group with a predetermined focal length; dividing the image frame into a first subframe and a second subframe; calibrating the first subframe and the second subframe to have substantially identical brightness; calculating an offset of a corresponded image region respectively in the first subframe and the second subframe; and calculating a depth of the image region according to the offset. Or the operating method includes the steps of: outputting an image frame by a third pixel group and a fourth pixel group with a predetermined focal length; dividing the image frame into a third subframe and a fourth subframe; calibrating the third subframe and the fourth subframe to have substantially identical brightness; calculating an offset of a corresponded image region respectively in the third subframe and the fourth subframe; and calculating a depth of the image region according to the offset.

More specifically, it is possible that the present disclosure calculates depths of different image regions according to different arrangements of the cover layer 113. In addition, the processor 13 determines the depth of the image region to be calculated according to different applications, e.g., calculating the depth according to only two pixel groups but ignoring pixel data of other pixel groups.

In the present disclosure, as the first pixel group includes a plurality of first pixels, the first pixel group and the first pixels are both indicated by a reference numeral $P_1$. Similarly, the second pixel group and the second pixels are both indicated by a reference numeral $P_2$, the third pixel group and the third pixels are both indicated by a reference numeral $P_3$, and the fourth pixel group and the fourth pixels are both indicated by a reference numeral $P_4$.

In addition, when the distance measurement device 1 is used to detect one object, corresponding to a two dimensional position of an object image in the image frame, the processor 13 further calculates a three dimensional coordinate of the object according to the two dimensional position and an object depth.

In addition, when the distance measurement device 1 is used to detect a plurality of objects, it is possible to further calculate both the depths and three dimensional coordinates of the plurality of objects according to the distance measurement methods of FIGS. 6 and 7.

In addition, although the present disclosure takes a dot object 9 as an example for illustration, the present disclosure is not limited thereto. Actually, the distance measurement device 1 does not necessary to recognize any object but respectively calculates depths of every image region according to the above distance measurement methods to construct a depth map of the image frame F.

It should be mentioned that values in above embodiments, e.g., the size and area ratio of the image frame F, are only intended to illustrate but not to limit the present disclosure. The element scale and arrangement as well as the direction in the drawings of the present disclosure are only intended to illustrate but not to limit the present disclosure.

It should be mentioned that in the above embodiments although the cover layer 113 is shown to be covered upon every pixel, it is only intended to illustrate but not to limit the present disclosure. In other embodiments, the cover layer 111 covers upon only a part of pixels of the pixel matrix 111, wherein outputted data of the part of pixels being covered by the cover layer 113 is used to identify a depth of the image region, and outputted data of the uncovered pixels is for other functions, e.g., the gesture recognition.

Figure 9:
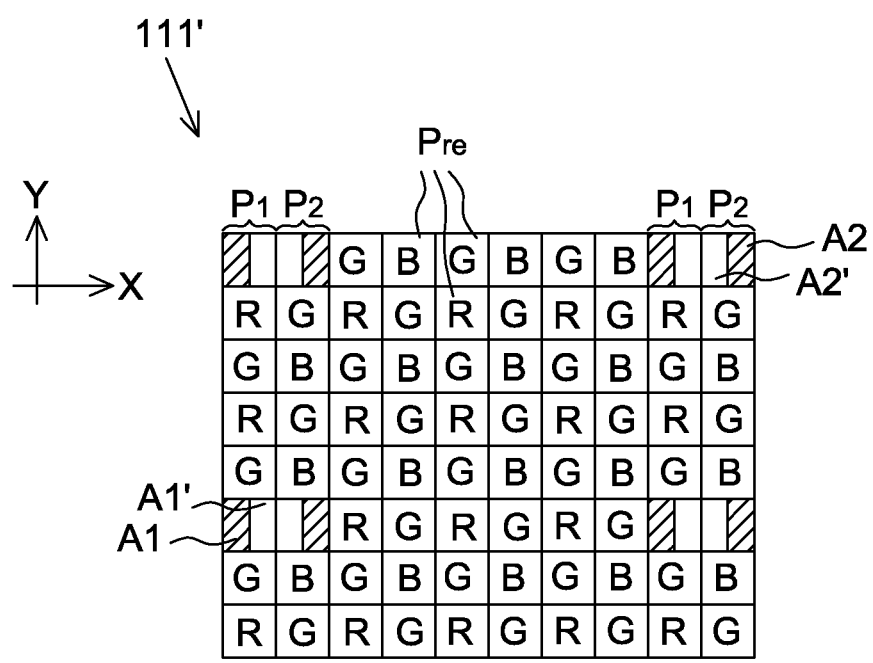
FIG. 9 is a schematic diagram of a pixel matrix of an imaging device according to one embodiment of the present disclosure.
Figure 10:
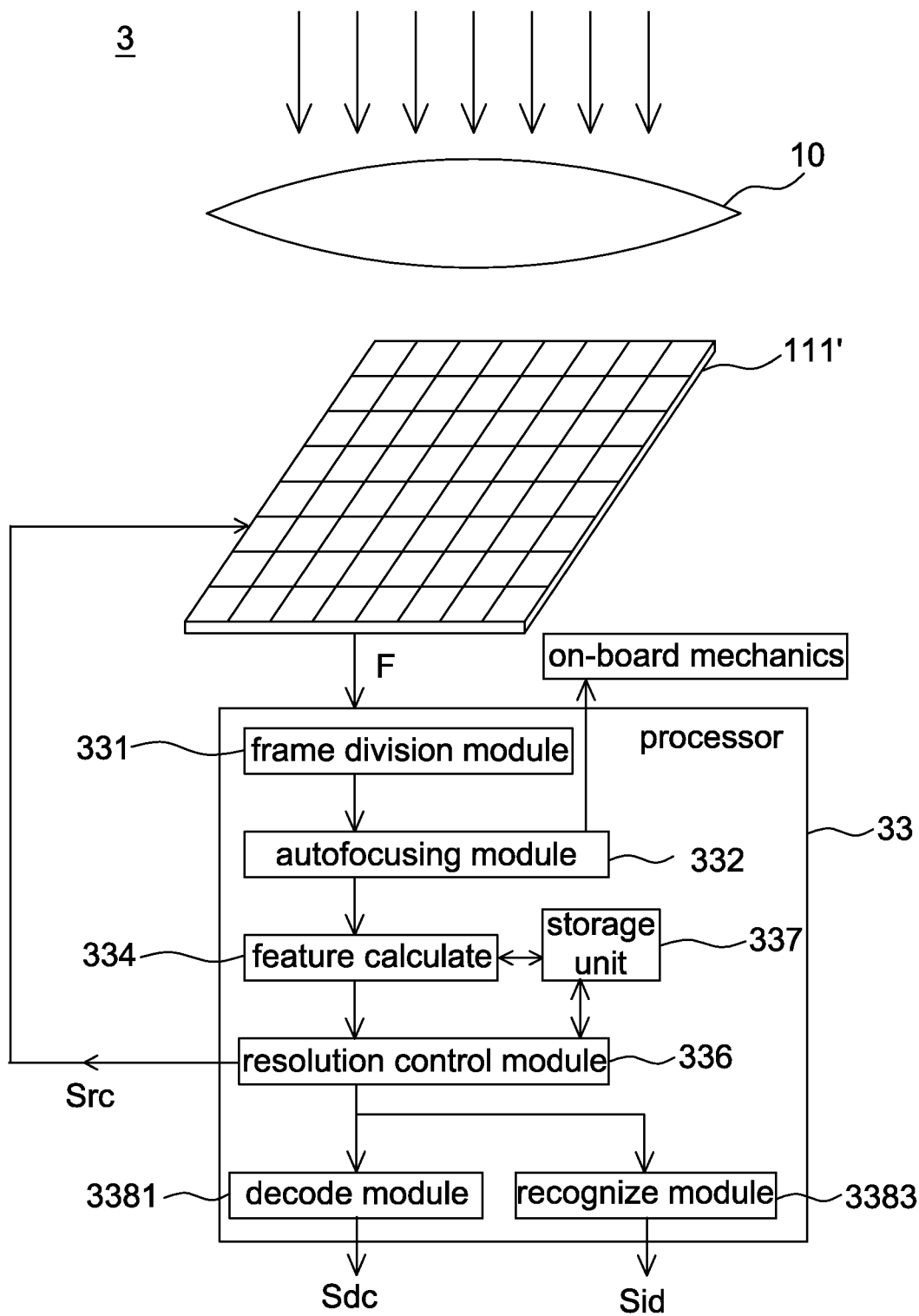
FIG. 10 is a schematic block diagram of an imaging device according to one embodiment of the present disclosure.

Referring to FIG. 9, it is a schematic diagram of a pixel matrix 111' of an imaging device 3 (as shown in FIG. 10) according to one embodiment of the present disclosure. In this embodiment, the aforementioned pixel groups $P_1$-$P_4$, $P_1'$-$P_4'$ (only the first pixel $P_1$ and the second pixel $P_2$ being taken as an example herein, but not limited thereto) are arranged in a part of pixel areas of the pixel matrix 111' used as phase detection pixels. The phase detection pixels $P_1$ and $P_2$ are preferably turned on for performing autofocusing as long as the imaging device 3 is powered on or a specific APP is run. The autofocusing herein is referred to automatically controlling a focal length of the condensing lens 10 of the imaging device 3 to cause external lights to be focused right on the pixel matrix 111'. Pixels other than the phase detection pixels $P_1$ and $P_2$ are referred to regular pixels Pre herein. The regular pixels Pre are used for other image post-processing instead of the phase detection.

It should mentioned that although FIG. 9 shows that two pixels of each phase detection pixel pair $P_1$ and $P_2$ are arranged adjacently along the X direction, the present disclosure is not limited thereto. In other embodiments, the two pixels of each of the phase detection pixel pairs $P_1$ and $P_2$ are arranged adjacently along the Y direction or diagonal direction. In alternative embodiments, the two pixels of each of the phase detection pixel pairs $P_1$ and $P_2$ are not arranged directly adjacent to each other.

In this embodiment, each phase detection pixel pair includes a first pixel $P_1$, a second pixel $P_2$, a cover layer 113 and a microlens 115 (as shown in FIGS. 2A-2B). The cover layer 113 covers upon a first region A1 of the first pixel $P_1$ and upon a second region A2 of the second pixel $P_2$, wherein the first region A1 and the second region A2 are rectangles of mirror symmetry. The microlens 115 is aligned with at least one of the first pixel $P_1$ and the second pixel $P_2$. An uncovered region A1' of the first pixel $P_1$ and an uncovered region A2' of the second pixel $P_2$ respectively receive incident light of different phases. In other embodiments, the uncovered regions A1' and A2' are not rectangles, e.g., an area thereof monotonically increasing from a center to an edge of a single pixel such as a triangle or a semicircle.

As mentioned above, the first region A1 and the second region A2 are 5% to 95% of an area of a single pixel. The method of forming the cover layer 113 has been illustrated above, and thus details thereof are not repeated herein.

In this embodiment, the phase detection pixels $P_1$ and $P_2$ are always on, while the regular pixels Pre are turned off or closed before the autofocusing is accomplished and at least a part thereof is selectively turned on after the autofocusing (e.g., after the type of post-processing being determined). Accordingly, the imaging device 3 of the present disclosure uses fewer pixels (only the phase detection pixels $P_1$ and $P_2$) to perform the autofocusing, and pixel data of the regular pixels Pre is not used in the autofocusing.

As mentioned above, when an object 9 reflects light L at a second focal length of the condensing lens 10 to the pixel matrix 111', object images in subframes reformed based on an image frame F outputted from the image sensor do not have a position shift; whereas, when the object 9 is not at the second focal length of the condensing lens 10, the object image in the image frame F outputted by the image sensor has a position shift toward different directions in subframes corresponding to pixels of different cover patterns (i.e. the first pixel $P_1$ and the second pixel $P_2$). Accordingly, it is possible to perform the autofocusing according to this property. For example, when corresponding object images between subframes do not have a position shift or the correlation between the subframes is lower than a predetermined value, the focal length is adjusted till said position shift becomes 0 or the correlation becomes larger than or equal to the predetermined value. It is appreciated that said adjustment of focal length may be implemented by on-board mechanics.

Referring to FIG. 10, it is a schematic block diagram of an imaging device 3 according to one embodiment of the present disclosure. The imaging device 3 of this embodiment includes the condensing lens 10 and an image sensor (shown by a pixel matrix 111' thereof). A processor 33 is included in or outside of the image sensor. The condensing lens 10 has been illustrated above as in FIG. 1, and thus details thereof are not repeated herein.

The image sensor senses light passing through the condensing lens 10 and outputs image data (or referred to gray levels, pixel data) to form an image frame F. The image sensor includes a pixel matrix 111' and a processor 33, e.g., forming an image sensor chip. As shown in FIG. 9, the pixel matrix 111' has a plurality of phase detection pixel pairs $P_1$ and $P_2$ (e.g., four pairs being shown in FIG. 9) and a plurality of regular pixels Pre, wherein a number of the phase detection pixel pairs $P_1$ and $P_2$ is preferably smaller than that of the regular pixels Pre. For example, the resolution of the phase detection pixel pairs $P_1$ and $P_2$ is lower than VGA level (640×480), whereas the resolution of the regular pixels Pre is higher than HD level (1920×1080), but not limited thereto.

The processor 33 includes a frame division module 331, an autofocusing module 332, a feature calculation module 334, a resolution control module 336, a decoding module 3381, a recognition module 3383 and a storage unit 337, wherein the storage unit 337 may or may not be included in the processor 33 without particular limitations. The storage unit 337 includes volatile and/or nonvolatile memory or buffer for storing parameters in operation, e.g., classifying image features to be compared and operating resolution to be selected. It is appreciated that, for illustration purposes, functions of the processor 33 are divided into different function blocks in FIG. 10, but all function blocks are considered to be executed or performed by the processor 33. The processor 33 is also a digital signal processor (DSP), a microcontroller (MCU), a central processing unit (CPU) or application specific integrated circuit (ASIC) that implements the above function blocks by software and/or hardware.

In this embodiment, the processor 33 performs autofocusing according to pixel data of the phase detection pixel pairs $P_1$ and $P_2$, and determines an operating resolution of the regular pixels Pre to be activated according to autofocused pixel data of the phase detection pixel pairs $P_1$ and $P_2$, wherein different resolutions correspond to different operations. The autofocused pixel data is referred to pixel data acquired by the phase detection pixel pairs $P_1$ and $P_2$ after the autofocusing is accomplished. For example, a first resolution (e.g., 3M) of the regular pixels Pre is for performing an image decoding, and a second resolution (e.g. 8M) is for performing an image recognition. For example, in the image decoding (e.g., decoding QR codes), it may not be necessary to use pixel data of all regular pixels Pre such that the first resolution is selected to be smaller than a number of the regular pixels Pre. In the image recognition (e.g., face recognition), a larger amount of pixel data is required and thus the second resolution is selected to be equal to a number of the regular pixels Pre or selected to be between the first resolution and the number of the regular pixels Pre.

When the frame division module 331 receives an image frame F (now only the phase detection pixel pairs $P_1$ and $P_2$ being turned on, and the image frame F including only pixel data of the phase detection pixel pairs $P_1$ and $P_2$ without including pixel data of the regular pixels Pre) from the pixel matrix 111', as shown in FIG. 4 the pixel data associated with a plurality of first pixels $P_1$ is reformed as a first subframe $F_{P1}$, and the pixel data associated with a plurality of second pixels $P_2$ is reformed as a second subframe $F_{P2}$.

Next, the autofocusing module 332 performs autofocusing using the first subframe $F_{P1}$ and the second subframe $F_{P2}$. For example, the autofocusing module 332 calculates a position shift between object images in or the mapping of spatial frequency information of the first subframe $F_{P1}$ and the second subframe $F_{P2}$. Before the autofocusing module 332 finishes the autofocusing or before the image decoding or the image recognition is selected, the regular pixels Pre are not turned on. The regular pixels Pre are only turned on when the resolution control module 336 determines the resolution to be used. As mentioned above, to improve the accuracy of the autofocusing, the processor 33 further calibrates brightness of the first subframe $F_{P1}$ and the second subframe $F_{P2}$ to be identical using a shading algorithm.

When the autofocusing module 332 finishes the autofocusing, e.g., said position shift being 0 or correlation of the spatial frequency exceeding a predetermined value, the autofocusing module 332 controls the pixel matrix 111' to acquire an autofocused image frame F (now the regular pixels Pre not yet being turned on, and the autofocused image frame F including only pixel data of the phase detection pixel pairs $P_1$ and $P_2$). The frame division module 331 also divides the autofocused pixel data of the phase detection pixel pairs $P_1$ and $P_2$ into a first subframe $F_{P1}$ and a second subframe $F_{P2}$ as in FIG. 4.

Then, the feature calculation module 334 calculates image features of at least one of the first subframe $F_{P1}$ and the second subframe $F_{P2}$ using a rule based algorithm and/or a machine learning algorithm. It is also possible to calculate the image features of both the first subframe $F_{P1}$ and the second subframe $F_{P2}$. This calculated current image features are compared with pre-stored image features in the storage unit 337 to confirm the function to be performed after at least a part of the regular pixels Pre are turned on. It is appreciated that the pre-stored image features are previously constructed by the feature calculation module 334 also using the rule based algorithm and/or the machine learning algorithm. More specifically, the feature calculation module 334 includes a rule based algorithm and/or a machine learning algorithm which are implemented by software and/or hardware. The feature calculation module 334 performs the data categorization by comparing current image features with pre-stored image features. The machine learning algorithm is, for example, a hand-crafted feature extraction algorithm, a convolutional neural network (CNN) algorithm or the like.

After the image categorization is accomplished, the categorized result is sent to the resolution control module 336. The resolution control module 336 then controls, e.g., by sending a control signal Src, the regular pixels Pre of the pixel matrix 111' to acquire pixel data with a first resolution or a second resolution. In this phase, the phase detection pixel pairs $P_1$ and $P_2$ are still turned on to output pixel data detected thereby. Information of the first resolution and the second resolution is previously stored in the storage unit 337.

The pixel data captured by the first resolution is for the decoding module 3381 to perform the image decoding and output a decoded signal Sdc, wherein the first resolution is, for example, smaller than a number of the regular pixels Pre. The pixel data captured by the second resolution is for the recognition module 3383 to perform the image recognition and output a recognized signal Sid, wherein the second resolution is, for example, identical to the number of the regular pixels Pre. The controls corresponding to the decoded signal Sdc and the recognized signal Sid are determined according to different applications without particular limitations, e.g., unlock or running specific APP.

Figure 11:
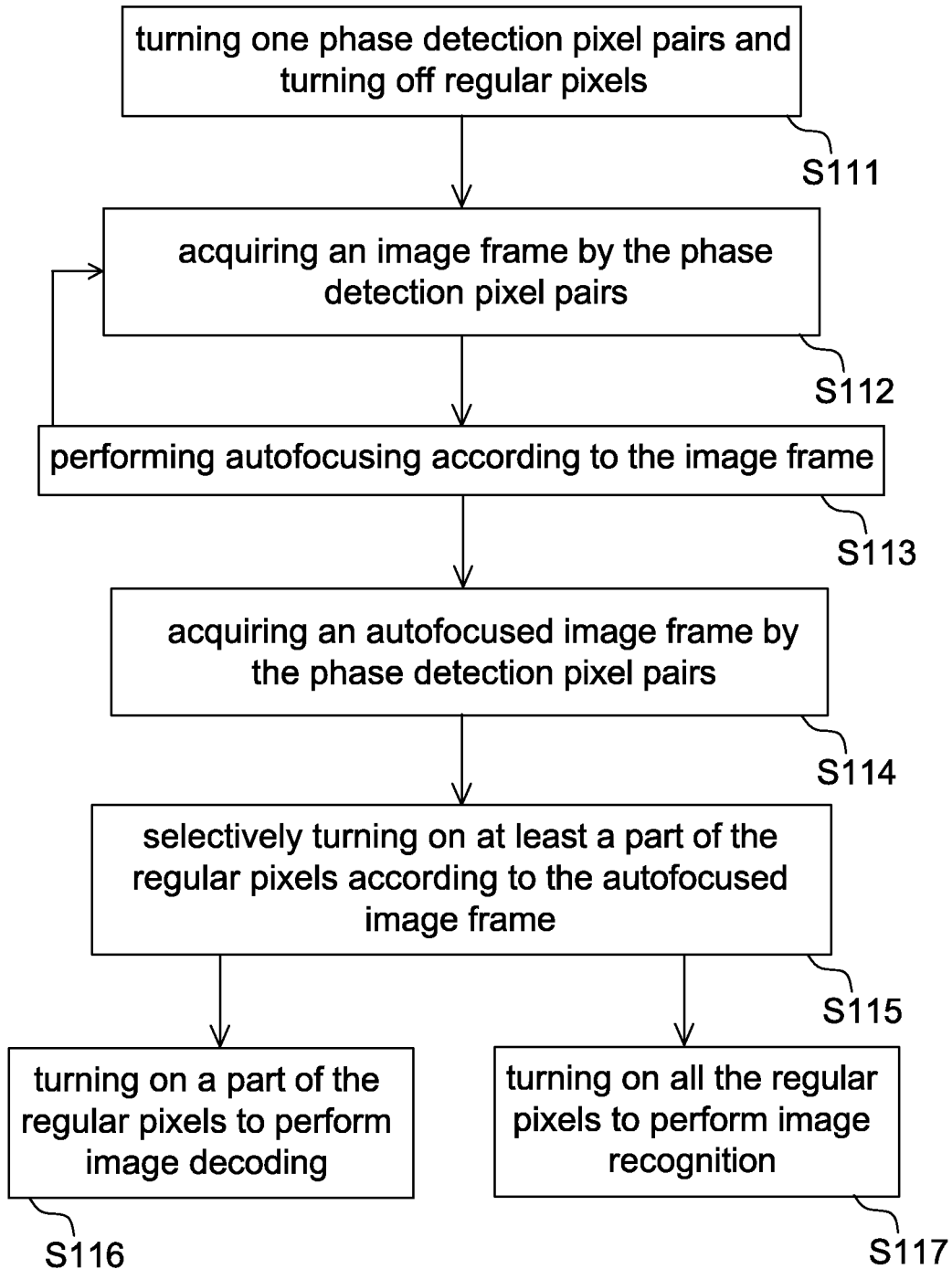
FIG. 11 is a flow chart of an operating method of an imaging device according to one embodiment of the present disclosure.

Referring to FIG. 11, it is a flow chart of an operating method of an imaging device according to one embodiment of the present disclosure including the steps of: turning on a plurality of phase detection pixel pairs and turning off regular pixels (Step S111); acquiring an image frame by the phase detection pixel pairs (Step S112); performing autofocusing according to the image frame (Step S113); acquiring an autofocused image frame by the phase detection pixel pairs (Step S114); selectively turning on at least a part of the regular pixels according to the autofocused image frame (Step S115); and turning on a first part of the regular pixels to perform an image decoding according to pixel data of the first part of the regular pixels (Step S116) or turning on all the regular pixels to perform an image recognition according to pixel data of the all regular pixels (Step S117).

Referring to FIGS. 9-11, details of this embodiment are illustrated below.

Step S111: When the imaging device 3 (e.g., a cell phone) is powered on or a predetermined APP is executed, the phase detection pixels (e.g., $P_1$ and $P_2$) are turned on and kept on all the time, but the regular pixels Pre are not turned on yet. As the phase detection pixel pairs $P_1$ and $P_2$ are only a part of pixels of the pixel matrix 111', a fewer pixels are used to perform autofocusing without using all pixels of the pixel matrix 111'. In addition, when only the phase detection pixel pairs $P_1$ and $P_2$ are turned on, the pixel matrix 111' operates at a lower frame rate; and when at least a part of the regular pixels Pre are turned on, the frame rate of the pixel matrix 111' is increased, or vice versa.

Step S112: The phase detection pixel pairs $P_1$ and $P_2$ of the pixel matrix 111' acquire and output an image frame F. It is appreciated that in this phase the image frame F includes only pixel data of the phase detection pixel pairs $P_1$ and $P_2$ without including pixel data of the regular pixels Pre. In addition, the pixel matrix 111' or the processor 33 includes a digital to analog converter for converting analog data of the image frame F to digital data.

Step S113: The frame division module 331 divides the image frame F into a first subframe and a second subframe (as FIG. 4). The autofocusing module 332 performs autofocusing according to the first subframe and the second subframe, e.g., calculating the position shift or correlation. In some embodiments, the autofocusing module 332 accomplishes the autofocusing by using one image frame F. In other embodiments, the autofocusing module 332 accomplishes the autofocusing by using more than one image frames F. In alternative embodiments, the frame division module 331 divides the image frame F into more than two subframes, e.g., FIG. 8, depending on the arrangement of the cover layer 113.

Step S114: When the autofocusing process is finished, the autofocusing module 332 controls the phase detection pixel pairs $P_1$ and $P_2$ of the pixel matrix 111' to acquire an autofocused image frame F, which still includes only pixel data of the phase detection pixel pairs $P_1$ and $P_2$. In the present disclosure, the image frame and the autofocused image frame are both acquired by the phase detection pixel pairs $P_1$ and $P_2$ but at different times.

Step S115: The frame division module 331 also divides the autofocused image frame F into a first subframe and a second subframe. The feature calculation module 334 calculates image features of at least one of the first subframe and the second subframe using a rule based algorithm and/or a machine learning algorithm, e.g., identifying whether to perform the decoding of QR codes by identifying whether the autofocused image frame F contains a rule of module widths of the finder pattern having a ratio of 1:1:3:1:1, and identifying Harr-like feature or Gabor feature in the autofocused image frame F using the super vector machine (SVM) or Adaboost to determine whether to perform the face recognition. In one embodiment, the rule based algorithm and the machine learning algorithm are performed concurrently or sequentially. For example, the feature calculation module 334 compares the calculated current image features with pre-stored image features in the storage unit 337 to confirm whether the image features of the autofocused image frame F belongs to the image decoding category or the image recognition category, and turns on at least a part of the regular pixels Pre to capture an image frame to be post-processed. The image frame to be post-processed includes pixel data of the phase detection pixel pairs $P_1$ and $P_2$ as well as pixel data of the at least a part of the regular pixels Pre. If the autofocused image frame F is identified not belonging to any of the image features pre-stored in the storage unit 337, the regular pixels Pre are not turned on and the phase detection pixel pairs $P_1$ and $P_2$ captures another image frame or another autofocused image frame.

Step S116: When the image features of the autofocused image frame F are analyzed belonging to the image decoding category, the resolution control module 336 controls a first part of the regular pixels Pre of the pixel matrix 111' and the phase detection pixel pairs $P_1$ and $P_2$ to acquire and output pixel data. The pixel data of the first part of the regular pixels Pre is for image decoding, wherein the algorithm of the image decoding is different according to different applications, e.g., decoding QR codes or other user defined codes. In some embodiments, the pixel data of the phase detection pixel pairs $P_1$ and $P_2$ captured in a same frame with the pixel data of the regular pixels Pre is also used in the image decoding. In other embodiments, the pixel data of the phase detection pixel pairs $P_1$ and $P_2$ is not used in the image decoding, and pixel data at positions of the phase detection pixel pairs $P_1$ and $P_2$ are obtained by interpolation using pixel data of the regular pixels Pre surrounding said positions.

Step S117: When the image features of the autofocused image frame F are analyzed belonging to the image recognition category, the resolution control module 336 controls a second part of the regular pixels Pre of the pixel matrix 111' and the phase detection pixel pairs $P_1$ and $P_2$ to acquire and output pixel data, wherein the second part is more than the first part or is all of the regular pixels Pre. The pixel data of the second part of the regular pixels Pre is for image recognition, wherein the algorithm of the image recognition is different according to different applications, e.g., face recognition or emotional expression recognition. In some embodiments, the pixel data of the phase detection pixel pairs $P_1$ and $P_2$ captured in a same frame with the pixel data of the regular pixels Pre is also used in the image recognition. In other embodiments, the pixel data of the phase detection pixel pairs $P_1$ and $P_2$ is not used in the image recognition, and pixel data at positions of the phase detection pixel pairs $P_1$ and $P_2$ are obtained by interpolation using pixel data of the regular pixels Pre surrounding said positions.

It should be mentioned that although FIG. 9 takes a color pixel matrix as an example for illustrating the pixel matrix 111', the present disclosure is not limited thereto. In other embodiments, the pixel matrix 111' is a monochromatic pixel matrix. It is appreciated that the arrangement of different color pixels in the color pixel matrix is not limited to FIG. 9, other conventional arrangements are possible, e.g., using Bayer pattern. The number and position of the phase detection pixel pairs $P_1$ and $P_2$ in FIG. 9 are only intended to illustrate but not to limit the present disclosure.

It should be mentioned that although the phase detection pixels in the above embodiment are illustrated by using multiple pairs of covered pixels or defect pixels, the present disclosure is not limited thereto. It is possible to implement the phase detection pixels by other pixel structures capable of perform autofocusing operation. For example, the phase detection pixels are formed by so-called dual pixel structure, and the processor 33 performs the autofocusing using a dual pixel autofocus technique according to pixel data of the phase detection pixels. Each of the dual pixel structure includes two adjacent pixels upon which different color filters are covered, and a micro-lens spans the two adjacent pixels. The principle of the dual pixel autofocus is known, e.g., referring to U.S. Patent Publication No. 2016/0205311 A1, and thus details thereof are not described herein. More specifically, the phase detection pixels of the present disclosure are partially covered pixels or have a dual pixel structure.

Similarly, in the embodiment of using the dual pixel structure, the frame division module 331 divides pixel data (or image frame) of the phase detection pixels into two subframes. The autofocusing module 332 performs an autofocusing process using the two subframes, e.g., calculating the correlation of spatial frequency. The feature calculation module 336 categorizes image features of autofocused pixel data (or autofocused image frame) by using a rule based algorithm and/or a machine learning algorithm. The resolution control module 336 controls at least a part of the regular pixels Pre to start to acquire pixel data according to the categorized result after the feature calculation module 336 recognizes the image features of the autofocused image frame. The decoding module 3381 performs the image decoding according to pixel data of a first resolution of the regular pixels Pre, and the recognition module 3383 performs the image recognition according to pixel data of a second resolution of the regular pixels Pre, wherein the first resolution is different from the second resolution.

In the present disclosure, the turned-off regular pixels Pre are referred to the pixels not exposed to light (e.g., by closing the shutter) or raw data of the exposed pixels is not read or outputted.

Conventionally, to decode QR codes, two different image sensors having different resolutions are adopted such that a larger module space is required. Therefore, the present disclosure further provides an imaging device (FIG. 10) and an operating method thereof (FIG. 11) that adopt phase detection pixels and regular pixels in a same pixel matrix to reduce the module size and improve the decoding speed. The phase detection pixels are turned on continuously for performing the autofocusing and image categorization, and the regular pixels are turned on only when the required algorithm is determined.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An imaging device comprising:
    a condensing lens;
    an image sensor for detecting light passing through the condensing lens and comprising a pixel matrix, wherein the pixel matrix comprises a plurality of phase detection pixel pairs and a plurality of regular pixels; and
    a processor for
        turning on the phase detection pixel pairs for autofocusing and outputting autofocused pixel data after completing the autofocusing;
        dividing the autofocused pixel data into a first subframe and a second subframe;
        calculating image features of at least one of the first subframe and the second subframe, wherein the image features comprise module widths of a finder pattern, and the finder pattern has a predetermined ratio, a Harr-like feature, or a Gabor feature; and
        determining an operating resolution of the regular pixels according to the image features calculated from at least one of the first subframe and the second subframe divided from the autofocused pixel data;
    wherein the phase detection pixel pairs are always on when the imaging device is powered on, and pixel data of the regular pixels is not used in the autofocusing.

2. The imaging device as claimed in claim 1, wherein each of the phase detection pixel pairs comprises:
    a first pixel and a second pixel;
    a cover layer covering upon a first region of the first pixel and upon a second region of the second pixel, wherein the first region and the second region are mirror symmetrical to each other; and
    a microlens aligned with at least one of the first pixel and the second pixel.

3. The imaging device as claimed in claim 2, wherein the first region and the second region are 5% to 95% of an area of a single pixel.

4. The imaging device as claimed in claim 1, wherein the processor is configured to perform the autofocusing using a dual pixel autofocus technique according to pixel data of the phase detection pixel pairs before the autofocusing is accomplished.

5. The imaging device as claimed in claim 1, wherein the processor is configured to
    divide pixel data of the phase detection pixel pairs into a third subframe and a fourth subframe before the autofocusing is accomplished; and
    perform the autofocusing according to the third subframe and the fourth subframe.

6. The imaging device as claimed in claim 5, wherein the processor is further configured to calibrate brightness of the third subframe and the fourth subframe to be identical using a shading algorithm.

7. The imaging device as claimed in claim 1, wherein the operating resolution is selected as a first resolution smaller than a number of the regular pixels or as a second resolution larger than the first resolution.

8. The imaging device as claimed in claim 1, wherein the regular pixels are turned off in the autofocusing.

9. The imaging device as claimed in claim 1, wherein a number of the phase detection pixel pairs is smaller than that of the regular pixels.

10. An imaging device comprising:

a condensing lens;

an image sensor for detecting light passing through the condensing lens and comprising a pixel matrix, wherein the pixel matrix comprises a plurality of phase detection pixel pairs and a plurality of regular pixels; and a processor configured for turning on the phase detection pixel pairs for autofocusing and outputting autofocused pixel data after the completing the autofocusing;

dividing the autofocused pixel data into a first subframe and a second subframe;

calculating image features of at least one of the first subframe and the second subframe, wherein the image features comprise module widths of a finder pattern, and the finder pattern has a predetermined ratio, a Harr-like feature, or a Gabor feature; and selecting an image decoding or an image recognition using pixel data of the regular pixels according to the image features calculated from at least one of the first subframe and the second subframe divided from the autofocused pixel data;

wherein the phase detection pixel pairs are always on when the imaging device is powered on, and the regular pixels are selectively activated for the image decoding or the image recognition.

11. The imaging device as claimed in claim 10, wherein each of the phase detection pixel pairs comprises:

a first pixel and a second pixel;

a cover layer covering upon a first region of the first pixel and upon a second region of the second pixel, wherein the first region and the second region are mirror symmetrical to each other; and a microlens aligned with at least one of the first pixel and the second pixel.

12. The imaging device as claimed in claim 10, wherein the processor is configured to perform the autofocusing using a dual pixel autofocus technique according to pixel data of the phase detection pixel pairs before the autofocusing is accomplished.

13. The imaging device as claimed in claim 10, wherein the processor is configured to divide the pixel data of the phase detection pixel pairs into a third subframe and a fourth subframe before the autofocusing is accomplished;

calibrate brightness of the third subframe and the fourth subframe to be identical using a shading algorithm; and perform the autofocusing according to the third subframe and the fourth subframe.

14. The imaging device as claimed in claim 10, wherein the processor is configured to calculate the image features using at least one of a rule based algorithm and a machine learning algorithm.

15. The imaging device as claimed in claim 10, wherein the image decoding is decoding QR codes, and the image recognition is face recognition.

16. An operating method of an imaging device, the imaging device comprising a plurality of phase detection pixel pairs and a plurality of regular pixels, the operating method comprising:

turning on the phase detection pixel pairs for autofocusing and outputting autofocused image frame after completing the autofocusing;

dividing the autofocused image frame, acquired by the phase detection pixel pairs, into a first subframe and a second subframe;

calculating image features of at least one of the first subframe and the second subframe, wherein the image feature comprise module widths of a finder pattern, and the finder pattern has a predetermined ratio, a Harr-like feature, or a Gabor feature; and selectively activating at least a part of the regular pixels according to the image features calculated from at least one of the first subframe and the second subframe divided from the autofocused image frame;

wherein the phase detection pixel pairs are continuously turned on when the at least a part of the regular pixels are activated, and the regular pixels are not activated in the autofocusing.

17. The operating method as claimed in claim 16, wherein the selectively activating comprises:

activating a first part of the regular pixels to perform an image decoding according to pixel data of the first part of the regular pixels; or activating all the regular pixels to perform an image recognition according to pixel data of the all regular pixels.

18. The operating method as claimed in claim 17, wherein pixel data of the phase detection pixel pairs captured in a same frame with the pixel data of the regular pixels is also used in performing the image decoding and the image recognition.

19. The operating method as claimed in claim 17, wherein the image decoding is decoding QR codes, and the image recognition is face recognition.

20. The operating method as claimed in claim 16, wherein the phase detection pixel pairs are partially covered pixels or have a structure of dual pixel.

* * * * *